US009102527B2

(12) United States Patent
Burke et al.

(10) Patent No.: US 9,102,527 B2
(45) Date of Patent: Aug. 11, 2015

(54) SYSTEMS AND METHODS FOR MAKING AND USING NANOELECTRODES

(75) Inventors: Peter J. Burke, Irvine, CA (US); Shengdong Li, Irvine, CA (US); Lifeng Zheng, Pasadena, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1090 days.

(21) Appl. No.: 12/973,388

(22) Filed: Dec. 20, 2010

(65) Prior Publication Data

US 2011/0162966 A1 Jul. 7, 2011

Related U.S. Application Data

(63) Continuation of application No. 10/789,779, filed on Feb. 27, 2004, now Pat. No. 7,857,956.

(60) Provisional application No. 60/450,985, filed on Feb. 27, 2003.

(51) Int. Cl.
*B03C 5/02* (2006.01)
*B82Y 30/00* (2011.01)
*B82Y 10/00* (2011.01)

(52) U.S. Cl.
CPC .............. *B82Y 30/00* (2013.01); *B03C 5/026* (2013.01); *B82Y 10/00* (2013.01)

(58) Field of Classification Search
USPC ................................................. 204/547, 643
See application file for complete search history.

(56) References Cited

U.S. PATENT DOCUMENTS 7,857,956 B2 * 12/2010 Burke et al. ............... 204/547
2003/0048619 A1  3/2003 Kaler et al.

OTHER PUBLICATIONS

A. Bezryadin et al., "Nanofabrication of electrodes with sub-5 nm spacing for transport experiments on single molecules and metal clusters", J. Vac. Sci. Technol. B 15(4), pp. 793-799 (Jul./Aug. 1997).
J. Chen et al., "Large on-off Ratios and Negative Differential Resistance in a Molecular Electronics Device," Science, vol. 286, pp. 1550-1552 (Nov. 19, 1999).
M.A. Reed et al., "Conductance of a Molecular Junction", Science, vol. 278, pp. 252-254 (Oct. 10, 1997).
P. J. Burke, Nanodielectrophoresis: Electronic Nanotweezers, published in Encyclopedia of Nanoscience and Nanotechnology, vol. X, pp. 1-19 (2003).

(Continued)

*Primary Examiner* — Arun S Phasge
(74) *Attorney, Agent, or Firm* — One LLP

(57) ABSTRACT

Systems and methods are provided for the manipulation of a polarizable object with a pair of elongated nanoelectrodes using dielectrophoresis. The nanoelectrodes can be carbon nanotubes and are coupled with one or more time-varying voltage sources to create an electric field gradient in a gap between the nanotubes. The gradient induces the movement of a polarizable object in proximity with the field. The nanotube pair can be used to trap a single polarizable object in the gap. A method of fabricating a nanoelectrode dielectrophoretic system is also provided. Applications extend to self-fabricating nanoelectronics, nanomachines, nanochemistry and nanobiochemistry. A nanoelectrode dielectrophoretic system having an extended nanoelectrode for use in applications including the self-fabrication of a nanowire, as well as methods for fabricating the same, are also provided.

17 Claims, 11 Drawing Sheets

(56) References Cited

OTHER PUBLICATIONS

L. Zheng et al., Towards Single Molecule Manipulation with Dielectrophoresis Using Nanoelectrodes, published in Proceedings of the Third IEEE Conference on Nanotechnolgy, vol. 1, pp. 437-440 (2003).
Kong et al, "Quantum Interference and Ballistic Transmission in Nanotube Electron Waveguides," Physical Review Letters, vol. 87, No. 10, 106801.
H. W. C. Postma et al, "Manipulation and imaging of individual single-walled carbon nanotubes with an atomic force microscope," Advanced Materials, vol. 17, pp. 1299-1302 (2000).
S. Li et al., "Carbon Nanotube Growth for GHz Devices," published in Proceedings of the Third IEEE Conference on Nanotechnolgy, vol. 1, pp. 256-258 (2003).
M. Reed et al., Molecular Random Access Memory Cell,: Applied Physics Letters, vol. 78, No. 23, pp. 3735-3737 (2001).
S.E. Baker et al., "Covalently Bonded Adducts of Deoxyribonucleic Acid (DNA) Oligonucleotides with Single-Wall Carbon Nanotubes: Synthesis and Hybridization," Nano Letters, vol. 2, No. 12, pp. 1413-1417 (2002).
K. A. Williams et al., "Carbon Nanotubes with DNA recognition," Nature, vol. 420, p. 761 (Dec. 2002).
L. Zheng et al., Manipulating Nanoparticles in Solution with Electrically Contacted Nanotubes Using Dielectrophoresis, American Chemical Society, Langmuir, vol. 20, pp. 8612-8619 (2004).
Michael Pycraft Hughes, "*AC electrokinetics: applications for nanotechnology*", Nanotechnology 11 (2000), pp. 124-132.
Wong et al., "*Covalently functionalized nanotubes as nanometre-sized probes in chemistry and biology*", Natue, vol. 394 (Jul. 2, 1998), pp. 52-55.
Li et al., "*Nanorobotics and Nanomanipulation*", Encyclopedia of Nanoscience and Nanotechnology, vol. 7,(American Scientific Publishers, Stevenson Ranch, CA) (2004), pp. 351-365.

\* cited by examiner ured by the Army. The
SYSTEMS AND METHODS FOR MAKING AND USING NANOELECTRODES

CROSS-REFERENCE TO RELATED APPLICATIONS

This application is a continuation of patent application Ser. No. 10/789,779 filed Feb. 27, 2004 now U.S. Pat. No. 7,857,956, and claims priority to provisional application Ser. No. 60/450,985 filed Feb. 27, 2003, which applications are fully incorporated by reference herein.

This invention was made with Government support under Grant No. DAAD19-02-1-0387, awarded by the Army. The Government has certain rights in this invention.

FIELD OF THE INVENTION

This invention relates to systems and methods for making and using nanoelectrodes for the manipulation of nano-scale polarizable objects for applications in molecular electronics, electronically assisted chemical self-assembly, nanomanufacturing, nano-biotechnology, and the like.

BACKGROUND OF THE INVENTION

Dielectrophoresis (DEP) is a technique that employs time-varying, or alternating current (AC) electric fields to apply a force to polarizable objects. The force relies on the difference in the polarizability of the system compared to its surrounding media (e.g. water) to manipulate not only charged objects (such as DNA) but also electrically neutral objects. In solution, particles are continually subject to the bombardment of surrounding molecules and undergo Brownian motion. This thermal motion exerts an effective random force on the particle, whose maximum is roughly proportional to the inverse of its radius. For DEP to be of use, the dielectrophoretic force must overcome the randomizing thermal motion acted upon the particle. Hence, electrodes as small as possible should be fabricated to trap nano-scale objects such as nanoparticles and even single molecules. To date, however, DEP research has only been performed with lithographically created electrodes having feature sizes that limit the attainable electric field gradients.

A related major research area is the electrical measurement of single molecules. This is because single molecule electronic devices are desired for use as the basis of next generation electronic information systems. There are two difficulties which have to be overcome in order to enable charge transport on single molecules. The first is the difficulty in preparing conducting electrodes separated by a distance which matches the length of the relevant molecule. This is because molecules of interest are usually beyond the resolution limit of electron beam lithography (~20 nm). The second is the difficulty in electrically contacting single molecules with sufficient conductivity.

A series of top-down approaches have been reported. (See, e.g., C. Dekker et al., "Nanofabrication of electrodes with sub-5 nm spacing for transport experiments on single molecules and metal clusters," J. Vac. Sci. Technol. B 15(4), 793 (1997) and M. A. Reed et al., "Large On-Off Ratios and Negative Differential Resistance in a Molecular Electronics Device," Science, Vol. 286, 1550 (1999)). C. Dekker made a pair of electrodes by electron beam deposition of amorphous carbon in a scanning electron microscope (SEM) chamber. Although a gap of approximately 4 nm was reported, the width of the gap should be much larger than 4 nm. Similar drawbacks are associated with the work of M. Reed et al. (M. A. Reed et al., "Conduction of a Molecular Junction" Science Vol 278, 252 (1997)). Although a gap distance within several nanometers was achieved, the width of the electrode pair was relatively large. Trapping and electrically contacting single molecule requires not only a small gap length but also a small gap width.

In addition to nanoelectrodes, nanowires are fundamental building blocks in nanotechnology. A key challenge in the application of these devices in massively parallel integrated circuits lies in their manufacturability. In particular, preceding technologies have been unable to control the spatial location of nanowires on a chip with nanometer resolution. Most manufacturing techniques consist of one of two approaches. In the first approach, catalyst sites are lithographically patterned and nanotubes, which are used as nanowires, are grown from these sites. While a significant first step, this method does not achieve resolution on the placement of nanotubes beyond the limits of lithography. Additionally, the direction in which the nanotubes grow is difficult to control. Another method consists of growing nanowires in bulk, dispersing them in solution and allowing the solution to evaporate on a solid surface. The nanowires are later contacted by lithography. While appropriate for research applications, this technique results in nanowires at random locations on a chip.

Some new techniques have been proposed and demonstrated to overcome some of these limitations. One technique uses direct current (DC) and AC electric fields to align the nanowires during or after growth. This controls their orientation and, to a lesser extent, their spatial position. A second, more promising technique is to chemically functionalize the ends of the nanowires so they bind to metal electrodes already in place. This controls their orientation, and position, although where the nanowires bind are limited by the spatial limit of how well the chemical groups can be attached to the electrodes. Additionally, there may be significant boundary resistance if the functional groups (e.g. COOH, $NH_2$ moieties) are not conducting.

SUMMARY

The present invention provides for, in part, a system for manipulating a polarizable object using dielectrophoresis. In a preferred embodiment, the system includes a first elongated nanoelectrode electrically coupled with a first time-varying voltage source and a second elongated nanoelectrode electrically coupled with a second voltage source. The voltage sources are configured to generate a time-varying electric field between the two nanoelectrodes, which are positioned to allow the dielectrophoretic manipulation of a polarizable object within the electric field. The nanoelectrodes each have a first and second end, where the first end of the first nanoelectrode is electrically coupled with the first voltage source and the first end of the second nanoelectrode is electrically coupled with the second voltage source. The nanoelectrodes are preferably positioned such that the first and second nanoelectrodes extend from the first end to the second end at least partially towards each other, with the second end of the first nanoelectrode being separated from the second end of the second nanoelectrode by a gap.

A method of dielectrophoretically manipulating a polarizable object with elongated nanoelectrodes is also provided. One embodiment of this method includes positioning a polarizable object in proximity with a first and a second elongated nanoelectrode and then applying a time-varying electric field between the first and second nanoelectrodes. Here, the field is sufficient to manipulate the polarizable object. In a preferred embodiment, the polarizable object is manipulated into a gap between the nanoelectrodes and trapped therein. This method can be used to trap nano-scale circuit devices to self-fabricate a nano-scale electronic circuit. This method can also be used to trap organic and other biological and biologically related molecules for applications in nanochemistry and nanobiotechnology.

The elongated nanoelectrodes are preferably carbon nanotubes coupled with one or more time-varying voltage sources via a catalyst site. Numerous methods of fabricating a dielectrophoretic system are also provided, including a method of depositing transition metals for a catalyst site using an aqueous solvent, as well as a method of fabricating nanotubes on a double metal layer.

The systems and methods described herein allow the use of elongated nanoelectrodes, preferably carbon nanotubes, for the dielectrophoretic trapping of polarizable objects. The systems and methods can be used in the dielectrophoretic assisted assembly of a nano-scale electrical circuit, electronically assisted chemical reactions for biological applications, lab-on-a-chip applications, nanochemistry, nanobiochemistry and the construction and operation of nanomachines.

The systems and methods described herein also provide for a nanotube dielectrophoretic system, which in one embodiment, has an elongated nanoelectrode coupled between a time-varying voltage source and a second voltage source. A time-varying electric field can be applied to the nanoelectrode to dielectrophoretically manipulate a polarizable object in proximity with the nanoelectrode. The object can be trapped on the surface of the nanoelectrode. The nanoelectrode can be either ohmically or capacitively coupled with the time-varying voltage source. In another embodiment, a plurality of polarizable objects are trapped on the surface and substantially cover the nanoelectrode forming a nanowire. Preferably, the nanoelectrode is a carbon nanotube and the objects are a gold nanoparticles. The systems and methods described herein also provide for methods of fabricating a nanowire. Other objects and features of the present invention will become apparent from consideration of the following description taken in conjunction with the accompanying drawings.

BRIEF DESCRIPTION OF THE FIGURES

FIG. 2(a) depicts double metal layers patterned on substrate, FIG. 2(b) depicts carbon nanotubes grown by chemical vapor deposition, FIG. 2(c) depicts carbon nanotubes separated by an AFM tip and FIG. 2(d) depicts dielectrophoresis using carbon nanotube electrodes.

FIG. 4(a) depicts a peptide nucleic acid backbone attached to a pair of carbon nanotube electrodes by dielectrophoresis assisted amide-based synthetic chemistry, FIG. 4(b) depicts a single stranded DNA complimentary to the peptide nucleic acid brought to its vicinity by dielectrophoresis and FIG. 4(c) depicts DNA coupled to a PNA (peptide nucleic acid) backbone to give rise to DNA-PNA duplex.

DETAILED DESCRIPTION

Figure 1A:
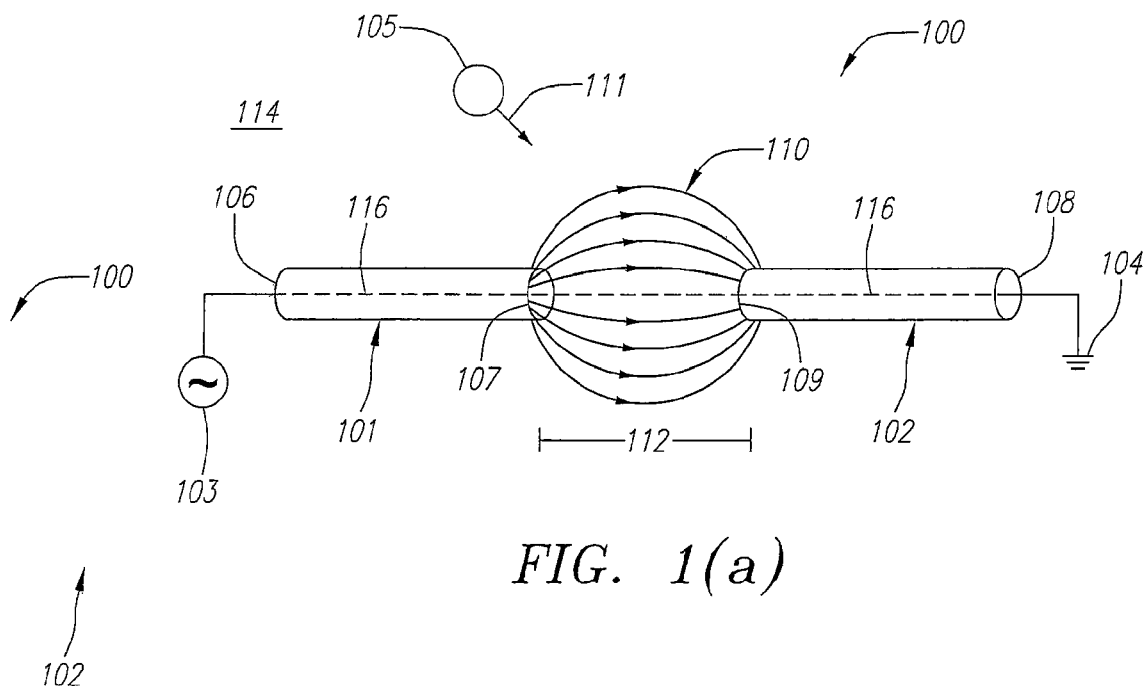
FIG. 1(a)-(b) depict exemplary embodiments of a nanoelectrode dielectrophoretic system.

The present invention provides systems and methods for making and using nanoelectrodes for the dielectrophoretic manipulation of polarizable objects. FIG. 1(a) depicts a nanoelectrode dielectrophoretic system 100, which is a preferred embodiment of the systems and methods described herein. The system 100 includes first and second elongated nanoelectrodes 101 and 102, which are electrically coupled with a first time-varying voltage source 103 and a second voltage source 104, respectively.

During operation, the voltage sources 103 and 104 apply a time-varying electric potential to the nanotubes 101 and 102 to create a time-varying electric field 110 between the two nanotubes 101 and 102. This electric field 110 induces a dipole moment on a polarizable object 105, which then, in the presence of a field gradient, experiences a dielectrophoretic force 111 that is sufficient to overcome the thermal Brownian motion and cause the object 105 to move. Preferably, the object 105 is moved into the gap region 112 between the nanoelectrodes 101 and 102 and trapped therein. In this manner, the system 100 allows the dielectrophoretic manipulation and trapping of a polarizable object 105.

Here, the nanoelectrode 101 is electrically coupled with the voltage source 103 at a first end 106. The elongated nanoelectrode 101 can extend along a center axis 116 to a second end 107. Similarly, the elongated nanoelectrode 102 is electrically coupled with the voltage source 104 at first end 108 and can extend along the same center axis 116 to second end 109. Ends 107 and 109 are separated by a gap 112 in which the object 105 can be trapped. The length of the gap 112 can be chosen according to the needs of the particular application, but is preferably at least approximately one nanometer (nm).

In the embodiment depicted in FIG. 1(a), the second voltage source 104 is ground. However, any DC or AC voltage source can be used, so long as an electric field gradient is created. Preferably, the nanoelectrodes 101 and 102 are cylindrically shaped, in the form of a rod, a tube or the like, to better allow for the creation of field 110. Each of the nanoelectrodes 101 and 102 can either be ohmically (DC) or capacitively coupled with the voltage sources. To capacitively couple a nanoelectrode 101 or 102 with the respective source, the nanoelectrode is preferably placed in proximity with a parallel plate connected with the voltage source. At Gigahertz frequencies, this capacitance can behave as a short-circuit, allowing efficient (e.g., low-impedance) contact between the voltage source 103 or 104 and the nanotube 101 or 102. For a GHz resonant frequency to be achieved, the length of the capacitively coupled nanoelectrode 101 or 102 is preferably on the order of 100 micrometers (μm). Capacitive coupling also facilitates the fabrication process because the capacitively coupled nanoelectrode 101 or 102 does not require a physical electrical contact with the voltage source 103 or 104.

The system 100 is placed in a surrounding medium 114 (e.g., water), which can effect the force 111 exhibited on object 105. As mentioned above, the object 105 is polarizable, meaning it can be either initially polarized or electrically neutral, so long as it is capable of polarization to create the dipole moment. Taking into account the polarizability of the medium 114 and the object 105 together, if the object 105 has a greater polarizability than the surrounding medium 114, then the force 111 pushes the object 105 towards the high field intensity region. This is referred to as positive DEP. Negative DEP is exhibited when the medium 114 has a greater polarizability than the object 105, in which case the force 111 pushes the object 105 towards the low field intensity region. In addition, the polarizability of the medium 114 and the object 105 can be frequency dependent, allowing both positive and negative DEP to be achieved by varying the frequency of the field 110, allowing object 105 to be selectively attracted or repelled. This and other effects relating to DEP are discussed in P. J. Burke, *Nanodielectrophoresis: Electronic Nanotweezers*, published in Encyclopedia of Nanoscience and Nanotechnology, Volume X, pp. 1-19 (2003), which is fully incorporated by reference herein as if set out in its entirety.

In order to overcome the thermal Brownian force, a large electric field 110 gradient is needed. The use of a nanoelectrodes 101 and 102 allows the creation of a large field 110, based in part on both the small radius of curvature of the nanoelectrodes and the elongated structure. In FIG. 1(a), the gradients of the electric field 110 are substantially equivalent to a geometry where a nanoelectrode 101 or 102 is in close proximity to a large conducting plane. Upon application of a reasonable time-varying voltage (e.g., 1 Volt), the resulting gradient of field 110 in the nano-scale is sufficient to manipulate and trap nano-scale objects 105, such as single molecules. In one embodiment, a molecule 105 is trapped from a vapor phase, which can be at atmospheric pressure, and used for applications in chemical sensing of large molecules. This is discussed in L. Zheng et al., *Towards Single Molecule Manipulation with Dielectrophoresis Using Nanoelectrodes*, published in Proceeding of the Third IEEE Conference on Nanotechnology (IEEE-NANO 2003), Volume 2, pp. 437-440 (2003), which is fully incorporated by reference herein as if set out in its entirety. Also, the term nano-scale, as used herein, is defined broadly as covering at least sizes of the object 105 ranging from 0.1 nm to 1 µm in size, or any polarizable object 105 that can be dielectrophoretically manipulated by system 100, regardless of size.

The nanoelectrodes 101 and 102 are preferably carbon nanotubes, because the diameter of a single-walled carbon nanotube is approximately 1 nm and allows the creation of a very large electric field gradient for a given applied voltage. This can enable very small objects 105 to be dielectrophoretically manipulated, regardless of the charge neutrality, down to approximately 1 nm in size. This can also allow the creation of nanotube junctions, such as that depicted in FIG. 1(b). Here, the carbon nanotube 101 includes a Y-junction 122, which branches into a third end 119. The branch of the Y-junction 122 can occur at various angles. The third end 119 can be coupled with another circuit 120 as desired, or it can be used to dielectrophoretically manipulate another object 105 (not shown). In the following discussion, the nanoelectrodes 101 and 102 are referred to as carbon nanotubes, however, it should be noted that any composition and structure of elongated nanoelectrode can be used, including other forms of nanotubes, nanowires and the like. Furthermore, the carbon nanotubes described herein can be either single-walled or multi-walled as desired in the application.

Figure 2A:
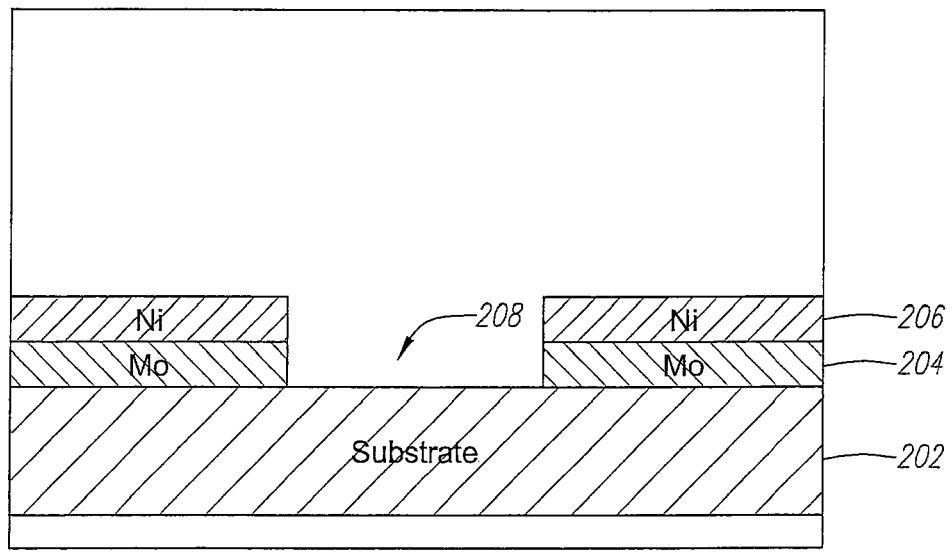
FIGS. 2(a)-(d) provide a flow chart of one exemplary embodiment of making carbon nanotube electrodes, where

The systems and methods described herein also provide for numerous methods of fabricating the nanoelectrode dielectrophoretic system 100. FIGS. 2(a)-2(d) depict one exemplary embodiment of a method for fabricating system 100. FIG. 2(a) depicts a first metal layer 204 and a second metal layer 206 deposited on a substrate 202, with a well 208 patterned through the two metal layers 204 and 206. The substrate can be a quartz wafer, silicon wafer and the like. Preferably, an insulating layer (not shown) is deposited between the substrate 202 and the metal layers 204 and 206. The deposition and patterning of these layers can be accomplished with a wide variety of processes, such as photolithography, electron beam lithography and the like. The upper metal layer 206 functions mainly as an active catalyst layer and can be composed of iron (Fe), nickel (Ni), or cobalt (Co) and the like. The upper metal layer 206 can also be deposited as a thin film alloy. The upper metal layer 206 is used for carbon nanotube growth. The diameter of the carbon nanotube can be adjusted by controlling the thickness of the layer 206. The lower metal layer 204 functions mainly as a supportive layer, and can be composed of a conductive metal having a high melting temperature, e.g. molybdenum (Mo) and the like, which is preferred for providing good electrical contact to the carbon nanotube.

Figure 2B:
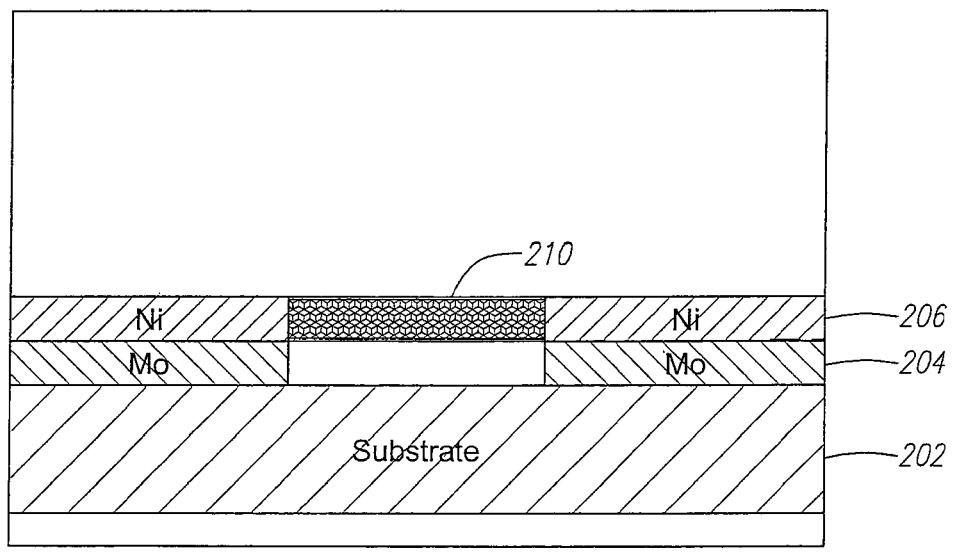

FIG. 2(b) depicts a continuous carbon nanotube 210 grown from a carbon source (including but not limited to methane, ethylene, acetylene or a mixture thereof) using chemical vapor deposition (CVD). Although carbon nanotubes can be produced via a variety of methods such as arc discharge and laser ablation, CVD is a well known as an approach to produce high quality carbon nanotubes with minimum defects and a low contact resistance. The quantum limit of contact resistance was observed on carbon nanotubes grown on oxide nanoparticles in Kong et al, "Quantum Interference and Ballistic Transmission in Nanotube Electron Waveguides," Physical Review Letters, Vol. 87, No. 10, 106801, which is fully incorporated by reference herein as if set out in its entirety. The two metal layers 204 and 206 provide improved electrical contact over insulating oxides. By adjusting the CVD growth conditions such as temperature, gas composition, flow rate, and metal thin film thickness, it is possible to gain high quality electrically contacted carbon nanotubes.

Figure 2C:
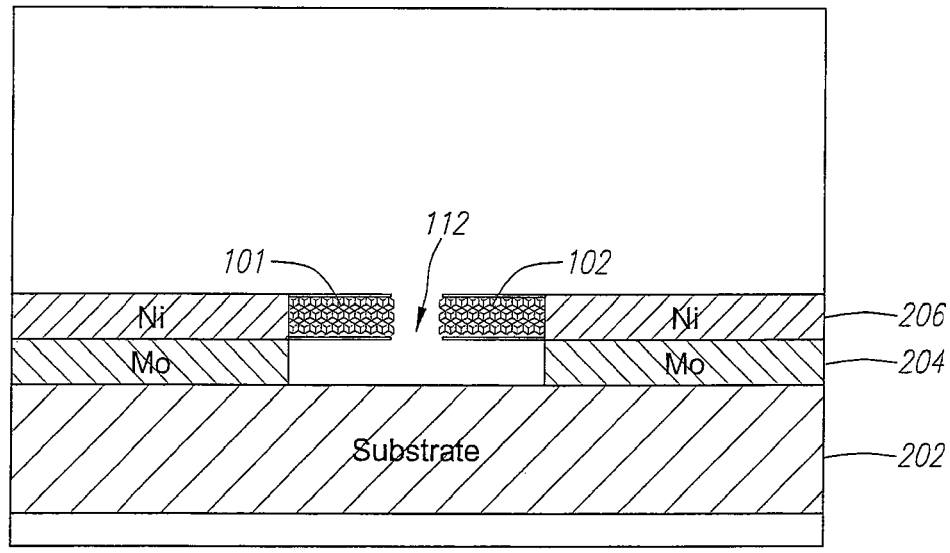

FIG. 2(c) depicts the continuous carbon nanotube 210 after being separated to form first and second nanotubes 101 and 102. The continuous carbon nanotube 210 is preferably separated by cutting through the entire nanotube 210 with an atomic force microscope (AFM) or a high resolution electron beam in order to provide an accurately controlled nanometer scale gap 112. The location of the gap 112, as well as the length of the gap 112 can be controlled during cutting. The separation of carbon nanotubes is discussed in detail in H. W. Ch. Postma et al, "Manipulation and imaging of individual single-walled carbon nanotubes with an atomic force microscope," Advanced Materials 17, 1299 (2000), which is fully incorporated by reference herein as if set out in its entirety. Because both mechanical cutting and thermal cutting introduce local defects, strong acids (including, but not limited to, heated $HNO_3$, $H_2SO_4$ and HCl and mixtures thereof) can be used to remove a controlled gap 112 in the nanotube 210 and produce carboxyl end-groups, which can then serve as the starting point for a series of organic and biological chemistry reactions.

Figure 1B:
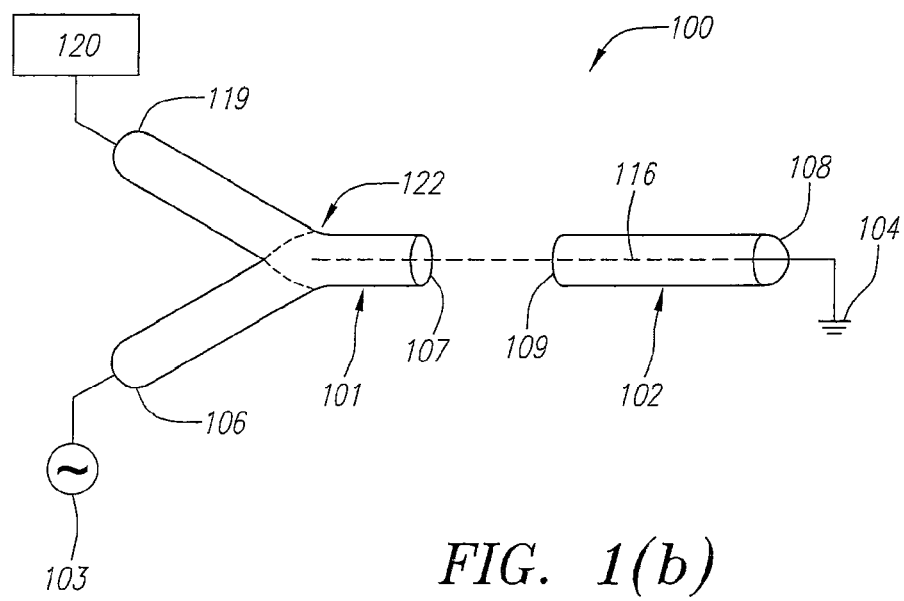

It should be noted that the carbon nanotubes 101 and 102 can also be fabricated individually. For instance, the nanotubes 101 and 102 can each be grown from a catalyst site in an axial direction at least partially towards the other, but preferably parallel to each other and opposing each other along a common central axis 116 as depicted in FIGS. 1(a) and 1(b). This eliminates the need to separate a single nanotube to form a conjugate pair. Because separating a single nanotube into a conjugate pair will frequently result in nanotubes aligned along substantially the same axis, the fabrication of separate nanotubes allows increased flexibility in placement. For instance, the carbon nanotubes 101 and 102 can be placed at various angles to each other and in asymmetrical configurations, if desired.

Figure 2D:
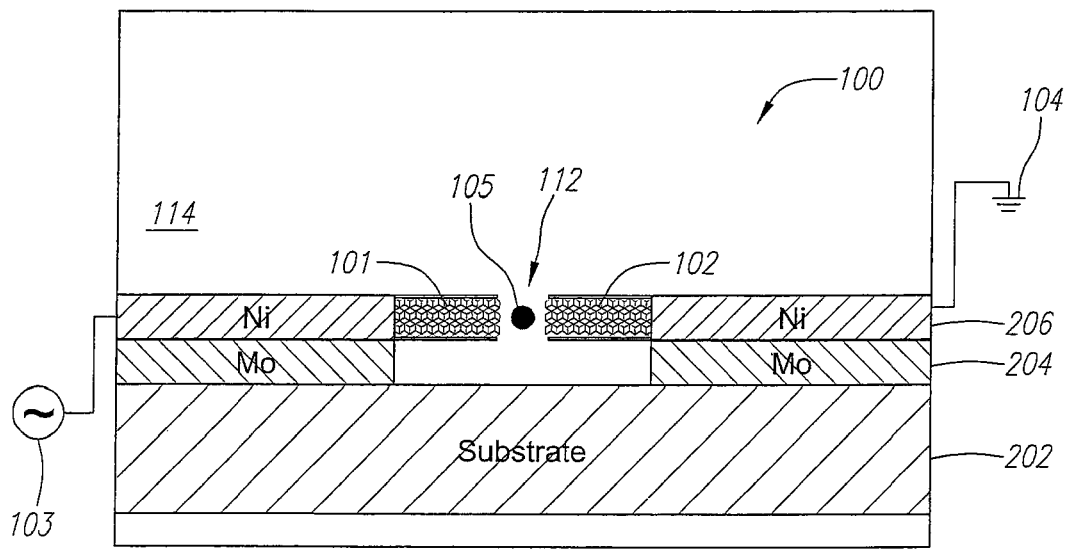

FIG. 2(d) depicts the system 100 in medium 114, with carbon nanotube 101 ohmically coupled with AC voltage source 103 and the carbon nanotube 102 ohmically coupled with voltage source 104, which in this case is ground. Here, an AC voltage is applied to the two carbon nanotube electrodes 101 and 102. The dielectrophoretic force generated by the carbon nanotube electrodes 101 and 102 is shown trapping an object 105 within gap 112.

The systems and methods described herein also provide for another method of fabricating carbon nanotubes. This aqueous catalyst method is directed towards a more efficient manner of fabricating the catalyst site from which the carbon nanotubes are grown using conventional photolithography. A typical method requires mixing alumina nanoparticles with transition metals in methanol and then spinning this mixture onto a wafer with pre-patterned polymethylmethacrylate (PMMA) wells. However, methanol cannot be spun onto wells patterned into photoresist because the methanol dissolves the photoresist. Thus, the typical method has disadvantages in that it requires either electron beam or deep-UV lithography to directly pattern the PMMA wells, or alternatively, the typical method disadvantageously requires a multi-step process involving both PMMA and photoresist. The aqueous catalyst method described herein is a simplified method of depositing transition metal catalysts using an aqueous solvent for the nanoparticle and transition metal catalyst mixture. This aqueous method eliminates the disadvantages relating to the typical method set forth above.

In one exemplary embodiment of the aqueous catalyst method, conventional photolithography is used to fabricate wells directly into photoresist. Then, a mixture of alumina nanoparticles and $Fe(NO_3)_3 \cdot 9H_2$) and $MoO_2(acac)_2$ are added to deionized water in sequence while violently stirring. Since the $Fe(NO_3)_3$ is soluble in water, spinning this solution directly onto the wafer would undesirably remove most of the Fe. To avoid this, ammonia can be added to the mixture in concentrate, which causes the formation of $Fe(OH)_3$ as a precipitant. The mixture is then stirred and sonified to create a suspension of $Fe_2O_3$, $MoO_3$, alumina and water. A small amount of the suspension is deposited on the wafer, which is then spun and baked. Then, lift-off of the photoresist in acetone provides the catalyst pattern ready to carry out CVD to form the carbon nanotubes. This process is described in greater detail in S. Li et al., "Carbon Nanotube Growth for GHz Devices," published in Proceeding of the Third IEEE Conference on Nanotechnology (IEEE-NANO 2003) Volume 2, pp. 256-258 (2003), which is fully incorporated by reference as if set out in its entirety.

Figure 3A:
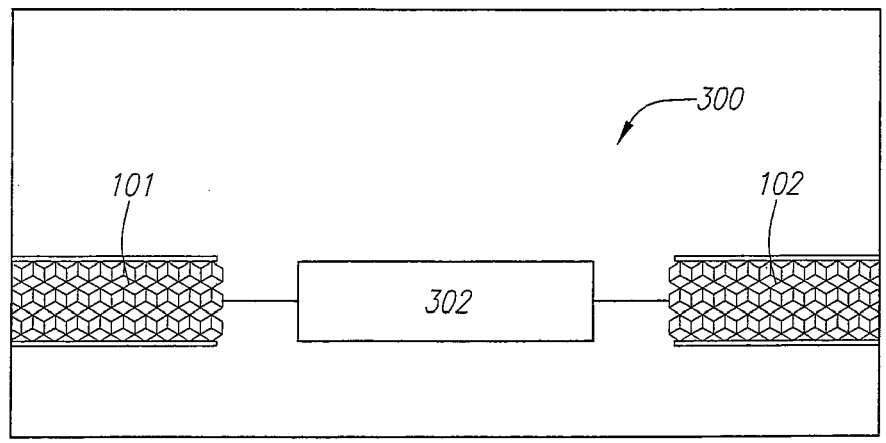
FIG. 3(a) depicts a schematic view of one exemplary embodiment of a molecular electronics circuit with carbon nanotube electrodes.

FIG. 3(a) depicts nano-scale electronic system 300, which is one exemplary embodiment of the systems and methods described herein. Here, dielectrophoretic manipulation is used to self-fabricate a functional electronic circuit. More specifically, FIG. 3(a) depicts a nano-scale circuit device 302 after it has been dielectrophoretically trapped between nanoelectrodes 101 and 102. The nano-scale circuit device 302 preferably bonds with and becomes electrically connected to each nanotube 101 and 102 after becoming trapped. This is because trapping and electrically contacting the nano-scale circuit device 302 can be a self-terminating process. Once the nano-scale circuit device 302 is electrically contacted, the electric field 110 will experience an abrupt decrease so that trapping of additional nano-scale circuit devices 302 is prevented.

Figure 3B:
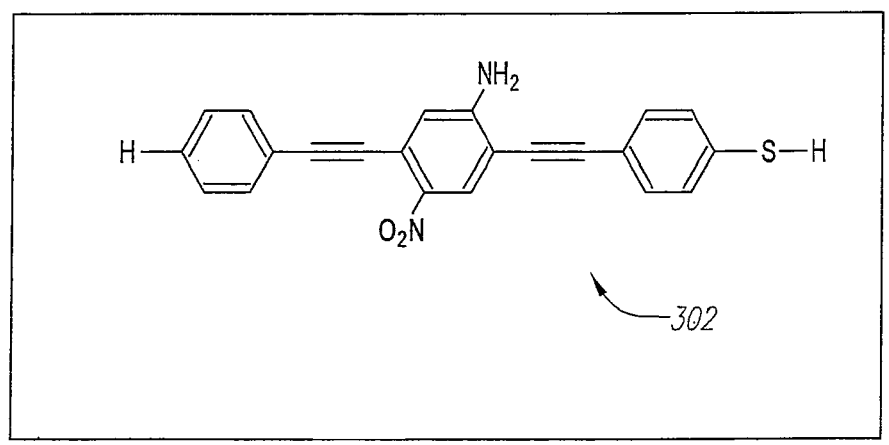
FIG. 3(b) depicts one exemplary embodiment of a molecular circuit device for use in the molecular electronics circuit of FIG. 3(a).

The nano-scale circuit device 302 can be any polarizable circuit device capable of bonding with nanoelectrodes 101 and 102. In one preferred embodiment, nano-scale circuit device 302 is a molecular transistor, such as 2'-amino-4'-ethynylphenyl-5'-nitro-1-benzenethiolate (AEENBT) and the like. A schematic representation of the AEENBT molecule 302 is depicted in FIG. 3(b). The production of a random access memory cell using refined electron beam lithography from AEENBT is described in detail in M. Reed et al., "Molecular random access memory cell," Applied Physics Letters, Vol. 78, 3735 (2001), which is fully incorporated by reference herein as if set out in its entirety. The structure of circuit device 302 can be chosen to provide any type of passive or active electrical function. Accordingly, circuit device 302 is not limited to molecular transistors, and can include other forms of transistors, capacitors, inductors, short circuit elements (e.g., wires), resistors and any other polarizable electrical element that can be dielectrophoretically manipulated into connection between nanoelectrodes 101 and 102.

To adequately trap an AEENBT molecule, the carbon nanotubes 101 and 102 preferably have a diameter of approximately 1-2 nm and the gap 112 is preferably approximately 2 nm in length. After trapping the circuit device 302, the carbon nanotube electrodes 101 and 102 can act as interconnects to other circuit electronics and link numerous nano-scale circuit devices together into a larger integrated circuit. The physical composition of the carbon nanotubes 101 and 102 also provides an increased likelihood in making an electrical contact with a single AEENBT molecule.

The use of nanoelectrodes 101 and 102 can also allow rapid investigation of many embodiments of a nano-scale electronic system 300 in a massively parallel fashion. With numerous dielectrophoretic systems 300 positioned over a single substrate, different types of circuit devices 302 and configurations of system 300 can be experimented with. For instance, the length of the gaps 112, the applied time-varying voltage and the molecular structure of device 302 can all be varied to arrive at the most optimal combinations.

Another advantage of attaching molecules with carbon nanotubes is the better contact quality between carbon and other nonmetal atoms. Most molecule/metal junctions are poor circuit elements. The resistance is usually of the order of mega ohm (M$\Omega$), which is not a preferable ohmic contact. One of the reasons for this is the difference in electro-negativity between metals and nonmetals. For example, in a S—Au(Ag) junction, an interfacial dipole leads to a Schottky barrier in that sulfur is more electronegative than metals. Carbon, a typical nonmetal, can more adequately provide electrical contact to organic molecules.

The systems and methods described herein can also be used to implement electronically assisted chemical reactions for biological applications. Biomolecules, such as deoxyribonucleic acid (DNA), peptide nucleic acid (PNA) and the like, can be linked to carbon nanotubes through noncovalent interaction and also bonded covalently to the carbon nanotubes through chemical reaction. To facilitate covalent bonding, ends 107 and 109 can be oxidized to into carboxyl groups. This process is discussed in greater detail in C. Lieber et al., "Covalently functionalized nanotubes as nanometer-sized probes in chemistry and biology," Nature, Vol. 394, 52 (1998), which is fully incorporated by reference herein as if set out in its entirety. A variety of reactions can be used to covalently bond biomolecules with the carboxyl groups at ends 107 and 109 to produce a wide range of biomolecule-carbon nanotube compounds. This process is discussed in greater detail in S. E. Baker et al., "Covalently Bonded Adducts of Deoxyribonucleic Acid (DNA) Oligonucleotides with Single-Wall Carbon Nanotubes: Synthesis and Hybridization," Nano Letters, Vol. 2, 1413 (2002) and K. A. Williams et al., "Carbon Nanotubes with DNA recognition," Nature, Vol. 420, 761, both of which are fully incorporated by reference herein as if set out in their entirety.

Figure 4A:
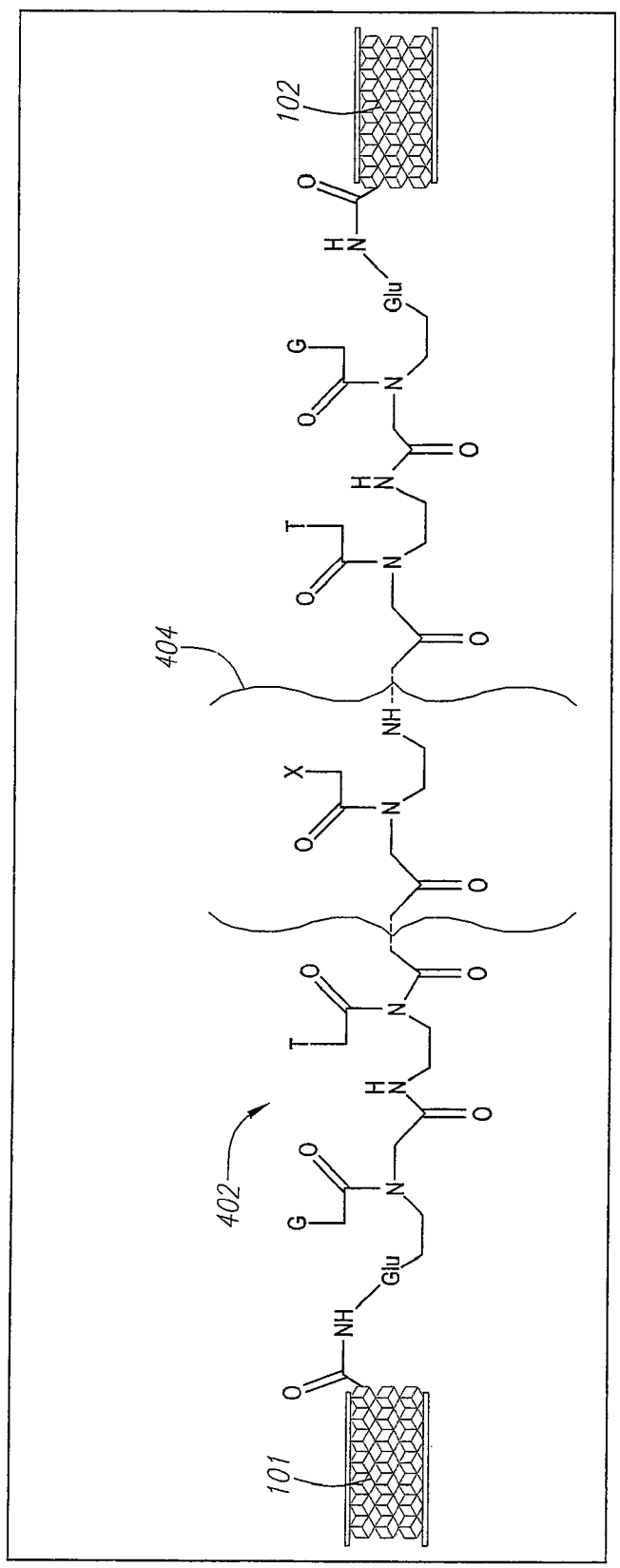
FIGS. 4(a)-(c) provide schematic depictions of one exemplary embodiment of an electronically assisted chemical reaction, where
Figure 4B:
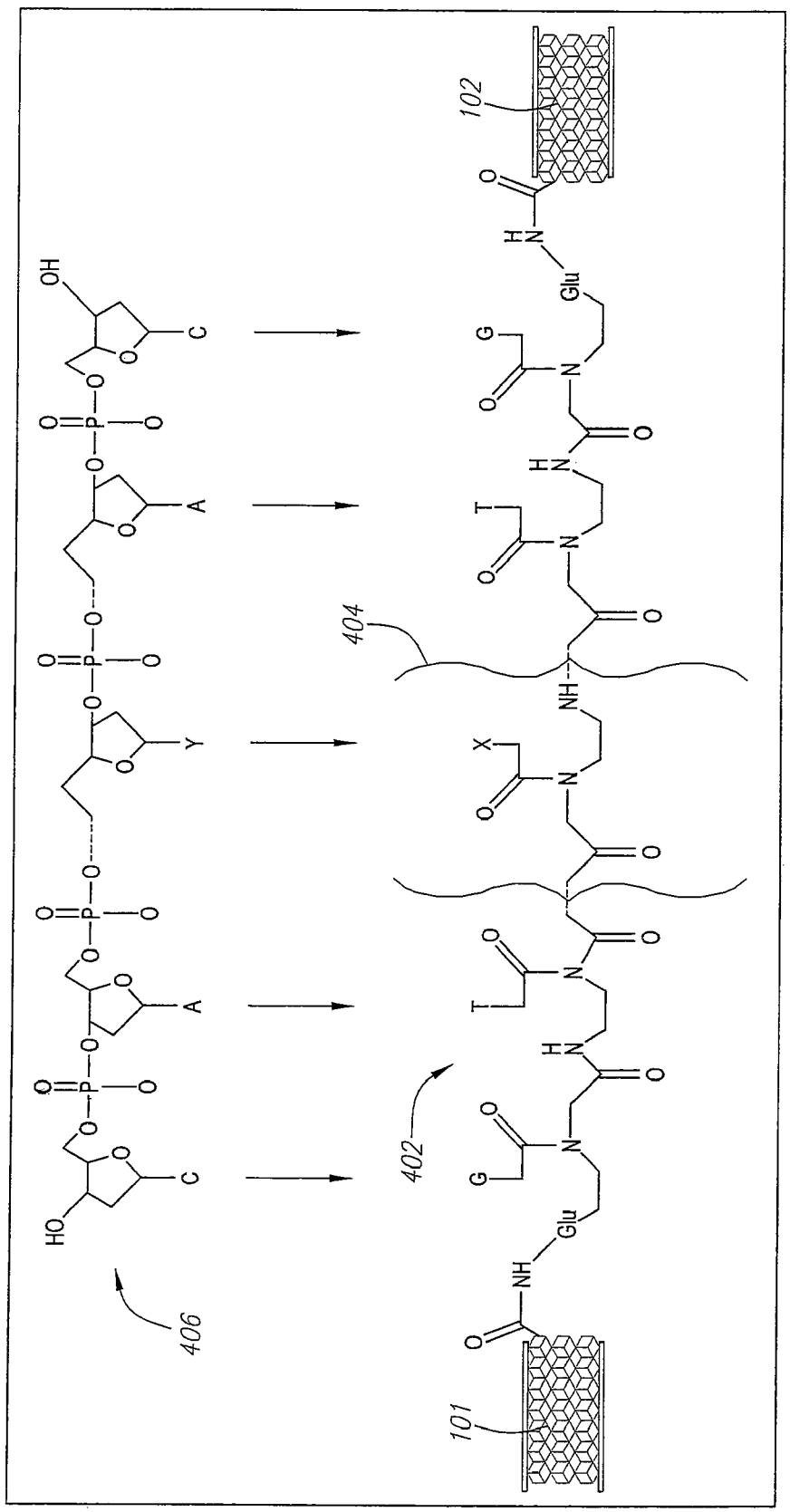
Figure 4C:
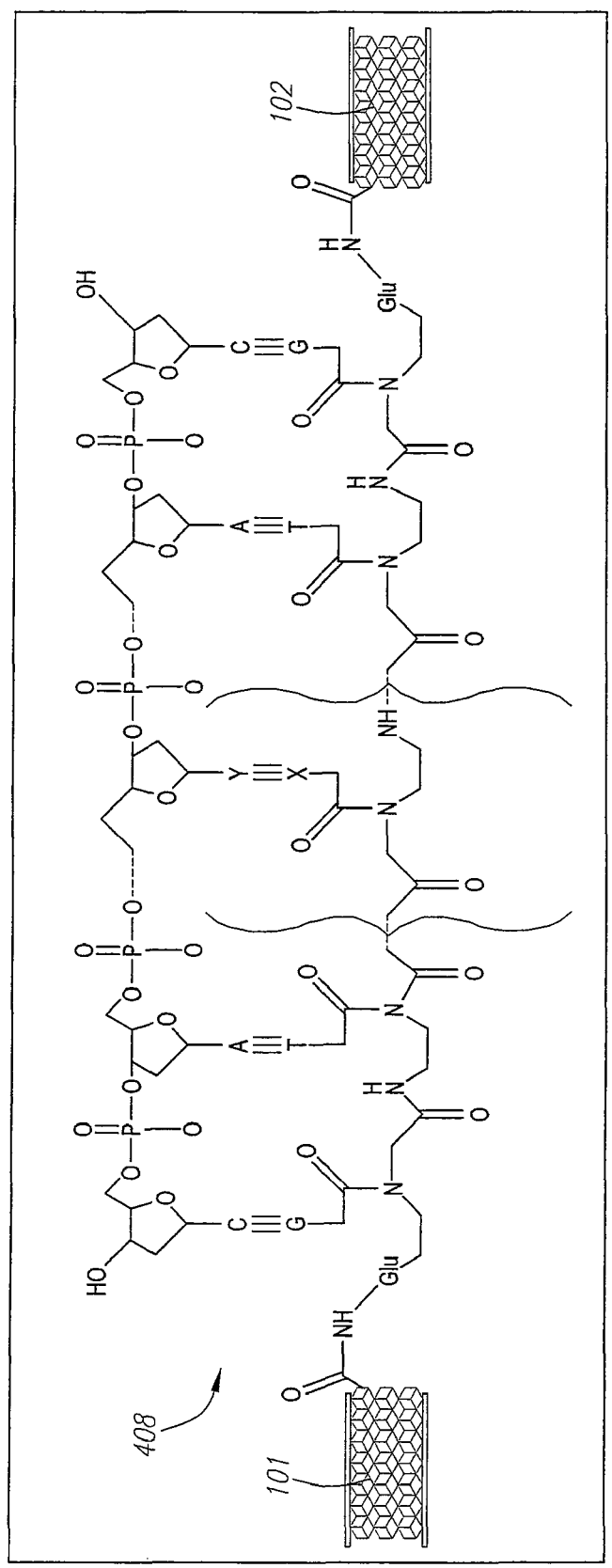

Although these references describe biomolecule-carbon nanotube compounds randomly dispersed in solution, the systems and methods described herein allow biomolecule-carbon nanotube compounds to be directly fabricated in a dielectrophoretically controlled manner. FIGS. 4(a)-4(c) depict an exemplary embodiment of an electronically assisted chemical reaction. In FIG. 4(a), a PNA backbone 402 is coupled with a pair of carbon nanotube electrodes 101 and 102 by dielectrophoresis assisted amide-based synthetic chemistry. In this exemplary embodiment, the repeated unit 404 is N-(2-aminoethyl) glycine and X can be any of the four natural nucleobases (i.e., adenine, cytosine, guanine, and thymine) Nucleobases are equally spaced on the PNA 402 adduct as are those for DNA.

In FIG. 4(b), a single stranded DNA 406 complimentary to the PNA 402 is brought into proximity with the PNA 402 by dielectrophoresis. Y can be any of the four natural nucleobases (i.e., adenine, cytosine, guanine, and thymine). In FIG. 4(c), the DNA strand 406 is bonded with PNA 402 to give rise to a DNA-PNA duplex 408. This method is highly selective and can be used in various applications, including, but not limited to oligonucleotide recognition elements in biosensor technologies. The method described herein, one embodiment of which is depicted in FIGS. 4(a)-(c), facilitates the formation of a lab-on-a-chip and molecular electronic devices, and facilitates electronically assisted chemical assembly, biological sensing and gene recognition.

Figure 5:
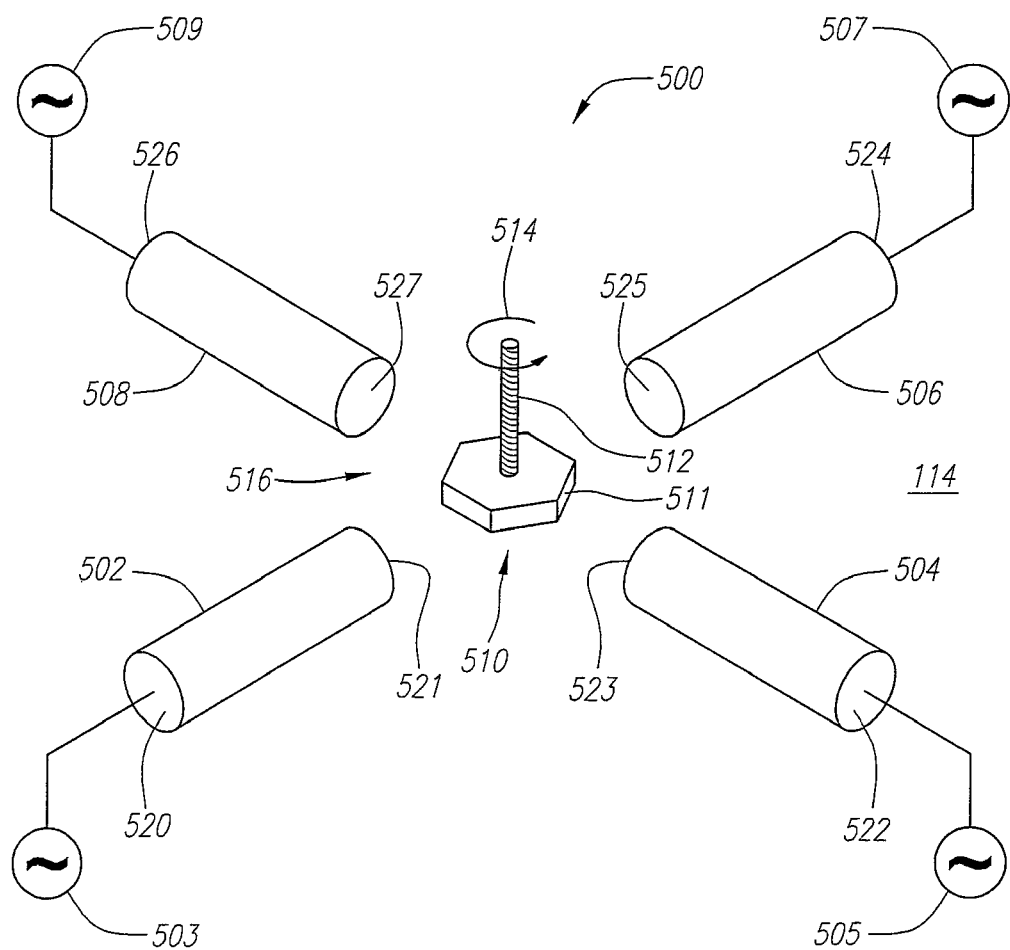
FIG. 5 depicts one exemplary embodiment of a nanomotor.

Referring now to applications in nanomachinery, FIG. 5 depicts an exemplary embodiment of a nanomotor system 500. The nanomotor system 500 includes three or more carbon nanotubes positioned radially around a common center region 516, in which is located a polarizable object 510. An electric field gradient is created between each of the nanotubes such that the object 510 is manipulated. The manipulation of the object 510 then creates an electrical or physical secondary effect, which can be harnessed and utilized in the desired application.

In the preferred embodiment depicted in FIG. 5, the nanomotor system 500 includes carbon nanotubes 502, 504, 506, and 508, each having ends 520, 522, 524 and 526 electrically coupled with voltage sources 503, 505, 507 and 509, respectively. The nanotubes 502-508, are arranged radially such that each extends at least partially towards each other and a common center region 516. The nanotubes 502, 504, 506, and 508 also each have a second end 521, 523, 525 and 527, respectively, spaced apart and defining common region 516. Here, the nanotubes 502-508 act as stators. Nanotubes 502 and 506 are preferably positioned substantially along the same first center axis, while nanotubes 504 and 508 are positioned substantially along the same second center axis, which is placed transverse to the first center axis.

The polarizable object 510 is preferably suspended in medium 114 and located in the common center region 510. In this embodiment, polarizable object 510 is configured to rotate and function as the rotor. Rotor 510 includes a base 511 connected with a rod 512, which transfers the rotational force for use by a secondary object (not shown). A rotational force in the direction 514 is created by a field gradient successively created between each of the nanotubes 502-508. For instance, time-varying voltage source 503 can be an AC voltage source operating with a phase of zero degrees. If each time-varying voltage source 505, 507 and 509 is an AC voltage source having a phase that successively lags the preceding voltage source in direction 514, then a rotational force will be created in direction 514. For instance, in a preferred embodiment, voltage sources 505, 507 and 509 have phases of 90, 180 and 270 degrees, respectively. One of skill in the art will recognize that there are numerous combinations of phase, amplitude and frequency which will induce rotational motion in rotor 510, along with variations in the number of nanotubes used as well as their placement. Accordingly, the nanomotor system 500 is not limited to solely the embodiment depicted in FIG. 5, nor the example phase values described above.

The systems and methods described herein can also find use in nanochemistry applications. The force required to break a single chemical bond is roughly one nanoNewton, which is the same order of magnitude as the force generated by dielectrophoretic system 100 on the polarizable object 105. Thus, system 100 can be used in controlling the breaking of a single chemical bond in nanochemistry processes.

Figure 6A:
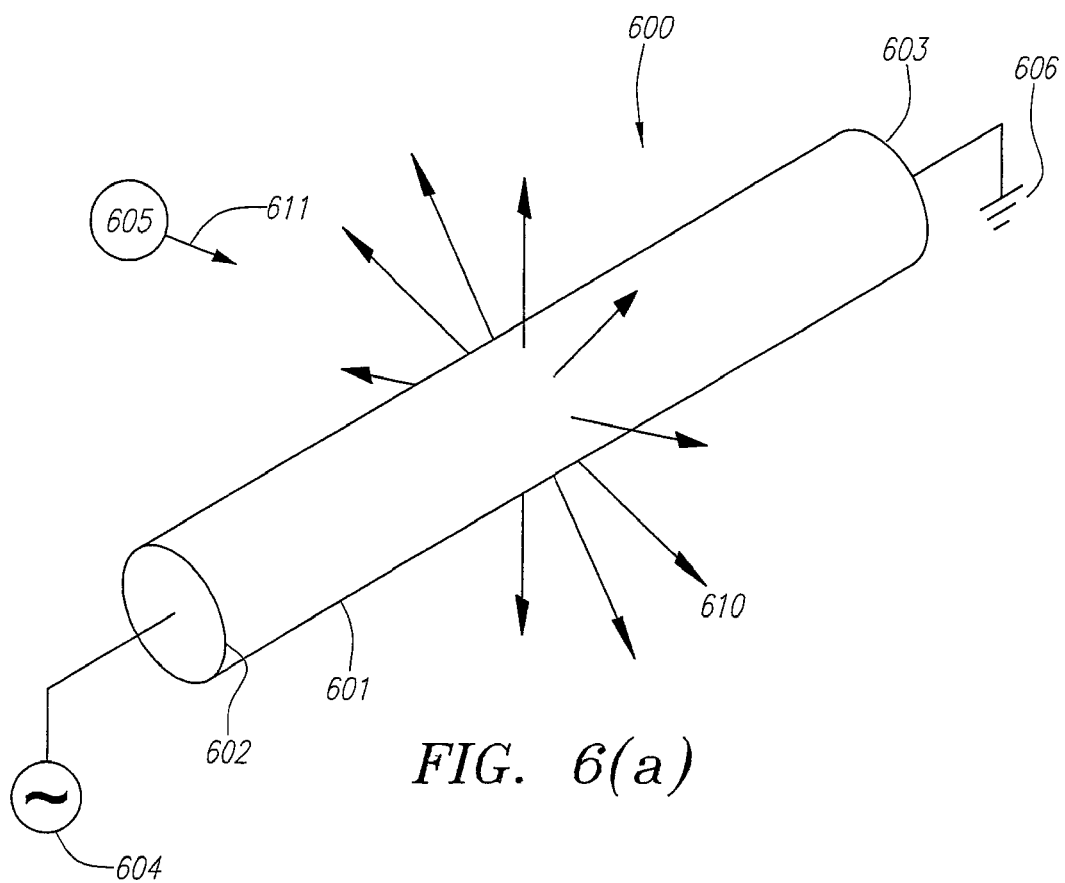
FIGS. 6(a)-(b) depict another exemplary embodiment of a nanoelectrode dielectrophoretic system.

FIG. 6(a) depicts an exemplary embodiment of a single nanoelectrode system 600, where one elongated nanoelectrode 601 is electrically coupled between two voltage sources 604 and 606. The nanoelectrode 601 can be cylindrically shaped in the form of a rod, a tube or the like, and is preferably a single-walled carbon nanotube, but the systems and methods described herein are not limited to such. As can be seen here, one end 602 of the nanoelectrode 601 is coupled with time-varying voltage source 604 and another end 603 is coupled with a second voltage source 606, which is preferably ground. Similar to the system 100, a time-varying (AC) electric field 610 is generated around the nanoelectrode 601 by the voltage sources 604 and 606 in order to dielectrophoretically manipulate a polarizable object 605 in proximity with the nanoelectrode 601.

This electric field 610 induces an (AC) dipole moment in the polarizable object 605. In the presence of an electric field gradient, there is a force on the dipole proportional to $(\vec{p} \cdot \vec{\nabla}) \vec{E}$, where $\vec{p}$ is the dipole moment, and $\vec{E}$ the electric field 610. Since $\vec{p} \propto \vec{E}$, the force is proportional to $(\vec{E} \cdot \vec{\nabla}) \vec{E} \propto \vec{\nabla}(\vec{E}^2)$. There is a thus a net DC force 611 in the direction of the higher intensity field. For the cylindrical geometry of the carbon nanotube 601, this force 611 is towards the surface of the nanotube 601. Thus, upon the application of an AC voltage, a polarizable object 605 is dielectrophoretically trapped at the surface of the nanotube 601.

Figure 6B:
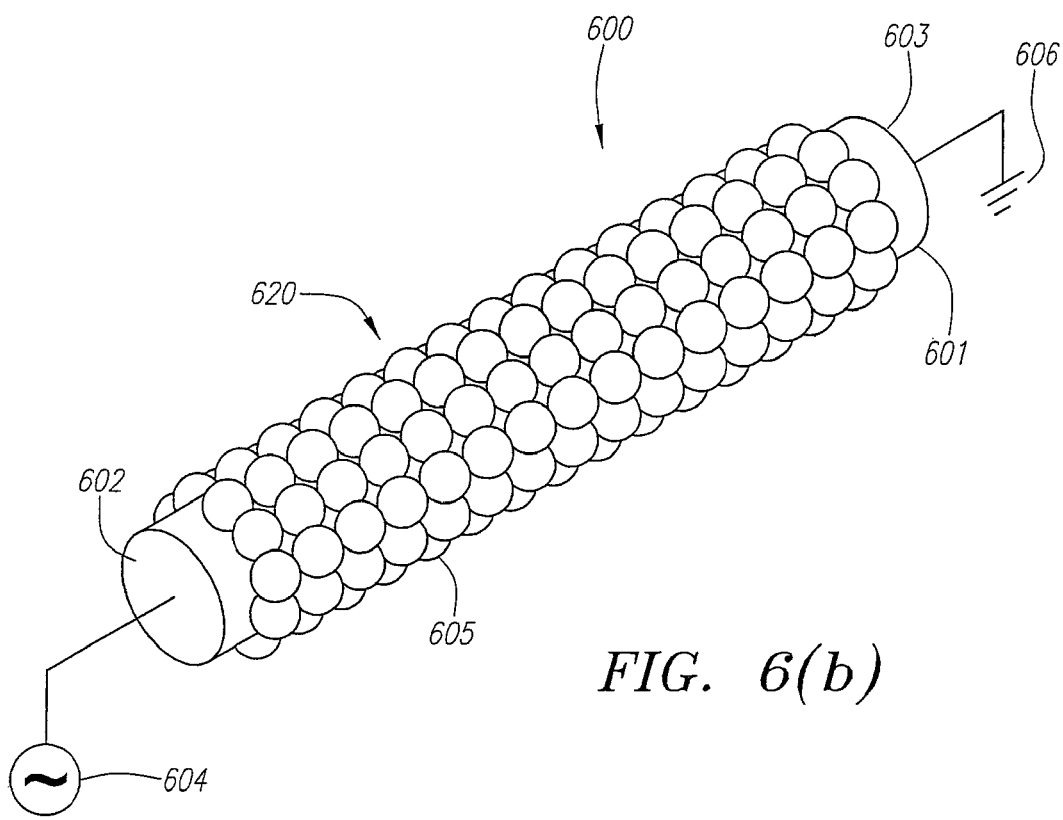

The single nanoelectrode system 600 can be used to dielectrophoretically trap numerous polarizable objects 605 along the length of the nanoelectrode 601 to form a nanowire. FIG. 6(b) depicts one exemplary embodiment of where gold (Au) nanoparticles 605 are trapped along the surface of the carbon nanotube 601 in order to form a nanowire 620. The nanowire 620 is substantially covered with nanoparticles 605 such that it exhibits increased conductivity over the nanotube 601, which in turn allows for the design and creation of more efficient integrated circuits. Preferably, Au nanoparticles 605 with a diameter of approximately 2 nm are used to form the nanowire 620. However, the size and composition of the polarizable object 605 can be varied as desired and according to the needs of the application.

The systems and methods described herein also provide for electronically controllable methods of fabricating the nanowire 620 using the carbon nanotube 601. These methods allow for the self-fabrication of the nanowires 620 that are ohmically connected with the voltage sources 604 and 606 as well as fabrication of the nanowires 620 that are only capacitively coupled with the sources 604 and 606. These methods can be used with various compositions and sizes of polarizable objects 605, as well as virtually any geometry of the nanotube 601, including straight, curved, kinked and transverse crossing orientations. These methods control with nanometer resolution where a nanowire 620 is fabricated, and can maintain the nanowire 620 in electrical ohmic contact with external electrodes immediately following fabrication with no post-growth processing needed. These methods are robust, reproducible, and relatively simple. When combined with a nanotube 601 located specifically on a chip using chemically functionalized end groups, such as a carboxyl group and the like, these methods are useful for massively parallel fabrication of low-resistance nanowires 620.

Figure 7A:
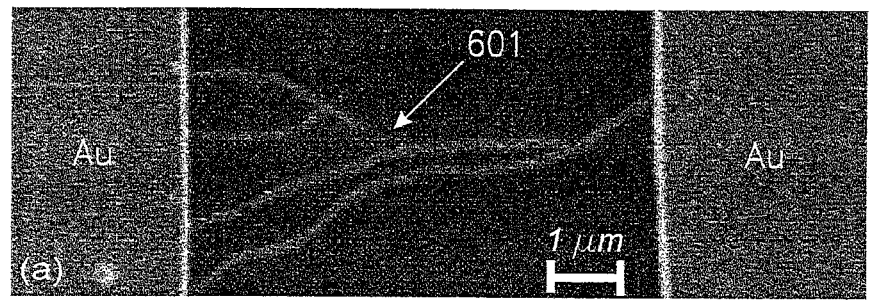
FIG. 7(a) is a SEM image of carbon nanotubes located between two electrodes.
Figure 7B:
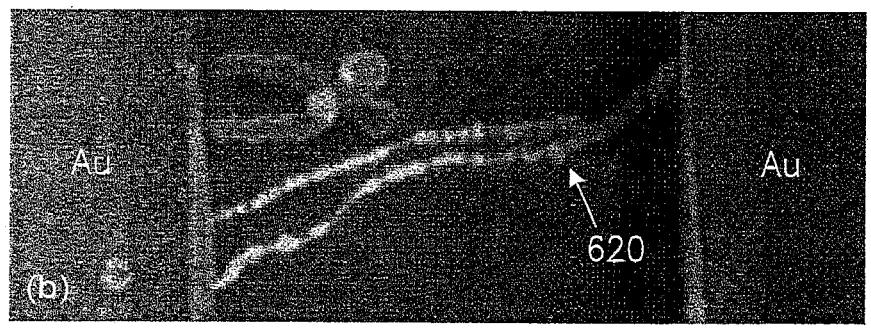
FIG. 7(b) is a SEM image of the carbon nanotubes of FIG. 7(a) substantially covered with gold nanoparticles to form a nanowire.

In one exemplary embodiment of a method of fabricating the nanowire 620, a carbon nanotube 601 is grown from lithographically patterned nanoparticle catalyst sites using CVD on an oxidized silicon wafer. A SEM was used to locate the nanotube 601 before the electrical contact, and the catalyst pattern was used to align electrical contacts to the nanotube 601. Electrical contact was performed with evaporated Titanium (Ti) (20 nm)/Au (200 nm) electrodes using optical lithography. The single-walled nanotubes 601 grown under similar conditions generally have a diameter less than 1.5 nm as measured with an AFM. FIG. 7(*a*) is an SEM image of experimental examples of electrically contacted nanotubes 601 before the nanowire fabrication. For the nanowire 601 shown in FIG. 7(*a*), the resistance between electrodes due to the nanotubes 601 was approximately 5 M$\Omega$.

Next, nanoparticles 605, which are preferably gold, are trapped on the surface of the nanotube 601 to form the nanowire 620. A colloidal solution, which in this embodiment is a 6 microliter aliquot containing 2 nm Au nanoparticles 605 dispersed in DI water, can be placed onto a chip containing the nanotubes 601. An AC voltage (square wave) of 2.5 V at 1 MHz can be applied to the electrodes which are already in electrical contact with the nanotubes 601 in order to dielectrophoretically trap the nanoparticles 605. The solution is allowed to dry while the AC voltage is left on. FIG. 7(*b*) is an SEM image of the completed nanowires 620 after the solution has dried.

The nanotube 601 does not need to be in electrical contact with the electrodes in order for the fabrication method to function. If the a nanotube is capacitively coupled with, i.e., close to, the Au electrodes but not in contact the Au nanowire 620 still grows on the nanotube 601. This is most likely due to the fact that the nanotube 601 significantly bends stray AC electric field lines 610 in its vicinity and this non-uniform AC electric field 610 is strong enough to trap the nanoparticles 605. The curves at room temperature of the nanowires 620 shown in FIG. 7(*b*) is linear to 5 volts, with a resistance of 780 kilo $\Omega$. This is a conductance about ten times higher than without the Au nanowire 620 growth.

In another embodiment, this resistance is decreased by altering the surface chemistry of the objects 105. In the previous embodiment, DI water was used as the solvent, and no special functionalization of the Au nanoparticles 605 was performed. Increased conductivity can be created through careful chemical treatment of the nanoparticles before the self-assembly process is initiated. For instance, the negative differential resistance can be achievable using 100 nm Au particles functionalized with self-assembled monolayers (SAMs). These fabrication methods have broad applicability. These methods also enable the use of other moderately conducting nanostructures, for example biological nanostructures such as DNA and proteins. Furthermore, since many self-assembled nanostructures have limited capacity to conduct electricity, these methods are useful for transforming such nanostructures from poor to excellent conductors. These systems and methods are discussed further in L. Zheng et al., "Self-Assembled Gold Nanowires from Nanoparticles," submitted for publication in Applied Physics Letters in 2004, which is incorporated by reference herein as if set out in its entirety.

Figure 8:
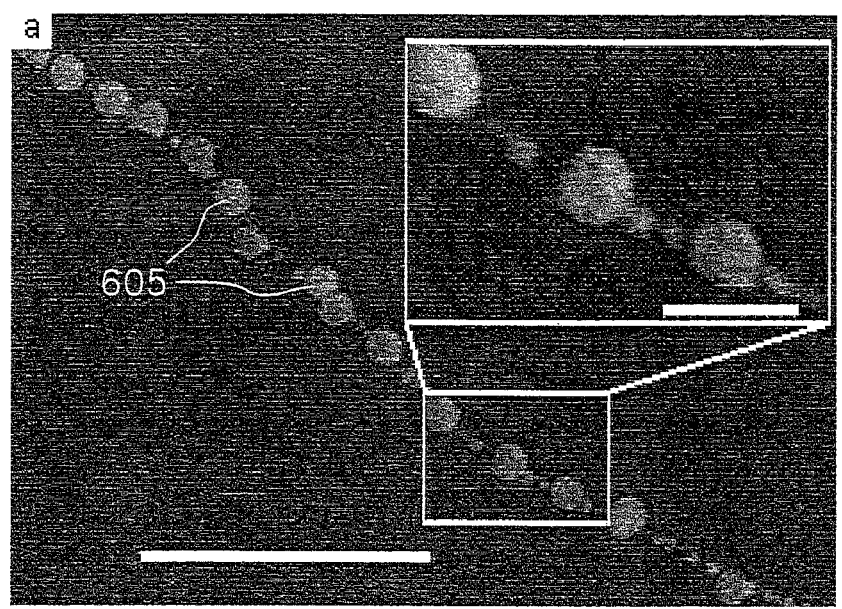
FIG. 8 is a SEM image of a carbon nanotube with polystyrene nanoparticles of varying diameter trapped thereon.

FIG. 8 depicts an SEM image of a carbon nanotube 601 (not visible) with polystyrene (Latex) nanoparticles 605 trapped thereon. These polystyrene nanoparticles 605 were trapped using the same nanowire 620 fabrication methods described above, with the exception that in this exemplary embodiment, a colloidal solution having approximately $10^9$ polystyrene nanoparticles 605 per milliliter was dropped onto a quartz chip. While this embodiment may not be the most preferable for the fabrication of highly conductive nanowires 620, it serves to further demonstrate the broad applicability of the systems and methods described herein. Dielectrophoretic manipulation of nanoparticles, such as polystyrene nanoparticles is discussed further in L. Zheng et al., "Manipulating Nanoparticles in Solution with Electrically Contacted Nanotubes Using Dielectrophoresis," submitted for publication in Journal Langmuir in 2004, which is incorporated by reference herein as if set out in its entirety.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit of the disclosure.

What is claimed is:

1. A system for manipulating a polarizable object using dielectrophoresis, comprising:
   a first elongated cylindrically shaped nanoelectrode comprising at least one nanotube electrically coupled with a first time-varying voltage source; and
   a second elongated nanoelectrode electrically coupled with ground, wherein the first voltage source and ground are configured to generate a time-varying electric field between the two nanoelectrodes, and wherein the nanoelectrodes are positioned to allow the dielectrophoretic manipulation of a polarizable object within the electric field.

2. The system of claim 1, wherein the nanoelectrodes each have a first and second end, the first end of the first nanoelectrode being electrically coupled with the first voltage source and the first end of the second nanoelectrode being electrically coupled with ground.

3. The system of claim 2, wherein the first and second nanoelectrodes are positioned such that the first and second nanoelectrodes extend from the first end to the second end at least partially towards each other, and wherein the second end of the first nanoelectrode is separated from the second end of the second nanoelectrode by a first gap.

4. The system of claim 3, wherein each nanoelectrode is aligned along substantially the same center axis.

5. The system of claim 3, wherein the gap is approximately one nanometer or greater.

6. The system of claim 3, further comprising:
   a third nanoelectrode having a first and a second end, the first end electrically coupled with a second voltage source; and a fourth nanoelectrode having a first and a second end, the first end electrically coupled with ground, wherein the second voltage source is time-varying and wherein each of the nanoelectrodes are arranged radially such that each nanoelectrode extends from the first end to the second end at least partially towards the other nanoelectrodes, the second end of the each of the nanoelectrodes being spaced apart from the others to define a common center region.

7. The system of claim 6, wherein the first and second nanoelectrodes are aligned along substantially the same first center axis and wherein the third and fourth nanoelectrodes are aligned along substantially the same second center axis transverse to the first center axis.

8. The system of claim 6, wherein a polarizable object is located in the common center region.

9. The system of claim 8, wherein the polarizable object is configured to function as a rotor.

10. The system of claim 9, wherein each voltage source is configured to operate at a separate phase to rotate the rotor in a radial direction within the common center region, the phase of each voltage source successively lagging the preceding source in the radial direction.

11. The system of claim 3, wherein the polarizable object is a molecular transistor coupled between the second end of the first nanoelectrode and the second end of the second nanoelectrode.

12. The system of claim 1, wherein the nanotube is a carbon nanotube.

13. The system of claim 12, wherein the carbon nanotube is single-walled.

14. The system of claim 12, wherein the carbon nanotube is multi-walled.

15. The system of claim 1, wherein at least one nanoelectrode is capacitively coupled with one of the first voltage source and ground.

16. The system of claim 1, wherein at least one nanoelectrode is electrically coupled with one of the first voltage source and ground at a metal electrode.

17. The system of claim 1, wherein the nanoelectrodes and polarized object are suspended in a solution.

* * * * *